United States Patent
Li et al.

(10) Patent No.: US 8,160,441 B2
(45) Date of Patent: Apr. 17, 2012

(54) OPTICAL FIBER ACCESS NETWORK AND COMMUICATION PROTECTION METHOD THEREOF

(75) Inventors: Han Li, Beijing (CN); Bing Wei, Beijing (CN); Jianming Zhou, Beijing (CN)

(73) Assignee: China Mobile Communications Corp. (CN)

( * ) Notice: Subject to any disclaimer, the term of this patent is extended or adjusted under 35 U.S.C. 154(b) by 903 days.

(21) Appl. No.: 12/066,087

(22) PCT Filed: Aug. 24, 2006

(86) PCT No.: PCT/CN2006/002172
§ 371 (c)(1),
(2), (4) Date: Aug. 27, 2008

(87) PCT Pub. No.: WO2007/030999
PCT Pub. Date: Mar. 22, 2007

(65) Prior Publication Data
US 2009/0148168 A1    Jun. 11, 2009

(30) Foreign Application Priority Data
Sep. 12, 2005 (CN) .......................... 2005 1 0102566

(51) Int. Cl.
*G02F 1/00* (2006.01)
(52) U.S. Cl. .............. 398/5; 398/1; 398/2; 398/3; 398/4
(58) Field of Classification Search ................ 398/1–38; 455/560, 14; 370/217, 221
See application file for complete search history.

(56) References Cited

U.S. PATENT DOCUMENTS

| | | | |
|---|---|---|---|
| 6,246,750 B1 * | 6/2001 | Ehreth | 379/56.2 |
| 6,889,009 B2 * | 5/2005 | Willebrand | 398/115 |
| 2006/0093356 A1 * | 5/2006 | Vereen et al. | 398/33 |

FOREIGN PATENT DOCUMENTS

| | | |
|---|---|---|
| CN | 2703365 Y | 6/2005 |
| JP | 2003298605 | 10/2003 |

OTHER PUBLICATIONS

Tsan-Jim Chan; A self protected architecture for wavelength division multiplexed passive optical networks; Nov. 2003; IEEE photonics technology letters vol. 15 No. 11, pp. 1660-1662.*

(Continued)

*Primary Examiner* — Kenneth N Vanderpuye
*Assistant Examiner* — Amritbir Sandhu
(74) *Attorney, Agent, or Firm* — Olson & Cepuritis, Ltd

(57) ABSTRACT

The present invention relates to an optical fiber access network and a communication protection method thereof. The optical fiber access network comprises an optical fiber communication system, a wireless communication system, a communication service switch device, a second optical network unit and a protection optical fiber. The wireless communication system is introduced to protect the optical fiber between the optical branching divider and the optical network unit in the optical fiber communication system. The protection optical fiber or the wireless communication system is used to protect the communication service respectively when there is a broken failure between the optical line terminal and the optical network unit in the optical fiber communication system. This invention overcomes the limit of the resource, protects communication service of the optical fiber communication system and improves the bandwidth utility of the communication system.

13 Claims, 3 Drawing Sheets

OTHER PUBLICATIONS

Zhaoxin Wang, A Novel Centrally Controlled Ptection Scheme for traffic Restoration in WDM Passive Opitcal Networks; Mar. 2005; IEEE photonics Technology lletters vol. 17 No. 3; pp. 717-719.*

Zhao Yubin; Wireless protection switching for Vedio service in wirelss optical broadband access network; 2009; IC-BNMT; pp. 760-764.*

Publication: International Search Report for International Application No. PCT/CN2006/002172 filed Aug. 24, 2006, International Publication No. WO 2007/030999 A1 published Mar. 22, 2007, of China Mobile Communications Corporation for An Optical Fiber Access Network and a Communication Protection Method Thereof.

* cited by examiner

OPTICAL FIBER ACCESS NETWORK AND COMMUICATION PROTECTION METHOD THEREOF

CROSS REFERENCES TO RELATED APPLICATIONS

This application is a national phase application based upon priority International PCT Patent Application No. PCT/CN2006/002172 filed Aug. 24, 2006, International Publication No. WO/2007/030999 A1 published Mar. 22, 2007, which is based upon priority Chinese Patent Application No. 200510102566.6 filed Sep. 12, 2005.

FIELD OF THE INVENTION

The present invention relates to an optical fiber access network and communication protection method thereof and especially relates to an optical fiber access network which can provide the function of communication protection and provide wireless communication protection when the optical fiber breaks, and a communication protection method which can protect the communication service from influence.

BACKGROUND OF THE INVENTION

The optical fiber access network is the inevitable trend of optical fiber communication. The optical fiber access network normally has five sorts of topological structures as follows: single star topology, multi-star topology, tree topology, bus topology and ring topology. The former four sorts can be called star structure. Compared with ring network and point to point system, the star network can save more optical fibers and optical receiving and sending modules, and the branch structure of it is easy for coverage. Therefore, the star structure is normally adopted in the optical fiber access network.

For protecting the normal work of communication service, the optical fiber line needs to be protected in the optical fiber access network. In prior art, the protection manner of the optical fiber line between the optical line terminal and the optical network unit is as follows:

1. The manner of separate fiber in one cable is adopted for protection, i.e. a main optical fiber and a backup optical fiber are set in one optical cable. When the main optical fiber is cut off, the backup optical fiber can be used. However, when the whole optical cable is cut off, the normal operation of communication service can't be insured.

2. The manner of separate cable in one pipe is adopted for protection, i.e. the main optical fiber and the backup optical fiber are set in different optical cables in one pipe or routing so that when the main optical fiber is cut off at the optical cable, the backup optical fiber can be used. However, this manner can only be used to prevent the optical cable from ordinary failure of being cut off but not the heavy failure, for example, the accidence of extensive optical cable pipe being cut off because of the construction of large-scale machinery.

3. The manner of separate cable in separate pipes is adopted for protection, i.e. the main optical fiber and the backup optical fiber are not only in different cables but also in different pipes or routings. This manner provides the maximum protection to the optical fiber line, but the economic cost is very high.

Due to being restricted by pipe, optical fiber resources and the cost of construction, the optical fiber line between the optical line terminal and the optical branching divider is normally protected only by the above-mentioned manners, and the optical fiber line between the optical branching divider and the optical network unit is seldom protected in the star structure access network. Once the optical fiber has the failure of being cut off, the network communication will become invalid.

Although the users who is sensitive to the price and needs the real-time information communication don't have strict requirement to the QOS of network and can put up with temporary bad performance of the network, such as network speed declining and so on, they can't put up with the break down of the network for long time. Thus, the adoption of suitable and effective methods for the protection of the optical fiber access network is the necessary assurance for communication fluency of the user network.

BRIEF SUMMARY OF THE INVENTION

The main subject of the present invention is to provide an optical fiber access network and a communication protection method thereof aiming at the above-mentioned defect existed in the 1+1 protection manner of the optical fiber access network and the reason and current situation that the protection to the optical fiber line between the optical branching divider and the optical network unit in the star topology optical fiber access network is deficient in practical use. The optical fiber access network and the method assemble the wireless communication system and optical fiber communication system so as to make the communication service of the optical fiber communication system obtain powerful insurance and effectively use the communication resource.

In order to realize above subject, the present invention adopts an optical fiber access network which comprises an optical fiber communication system which at least consists of an optical line terminal 1, an optical branching divider 2, a first optical network unit 3 and an user terminal integration access device 4. A work optical fiber 91 and a protection optical fiber 92 for protecting the line of said work optical fiber 91 are set between the optical line terminal 1 and the optical branching divider 2. Said optical fiber access network also comprises a wireless base station 5 which is connected with said optical branching divider 2 through a second optical network unit 6. Said wireless base station 5 wirelessly communicates with a wireless user terminal device 7. The wireless user terminal device 7 and said first optical network unit 3 are connected with a communication service switch device 8 for switching the communication line respectively. The communication service switch device 8 is connected with said user terminal integration access device 4. Said wireless user terminal device 7 further communicates with said first optical network unit 3. Said optical line terminal 1 is provided with a first detection module 11 for detecting the signal in the work optical fiber 91 and the protection optical fiber 92, and a network managing system 12 for managing the integrated services of said optical line terminal 1. Said first detection module 11 is connected with said network management system 12. Said first optical network unit 3 is provided with a second detection module 31 for detecting signals and a control module 32 for sending a switching control signal to said communication service switch device 8. Wherein, said second detection module 31 can be connected with said control module 32. Said communication service switch device 8 can be set in said the first optical network unit 3, that is to say said communication service switch device 8 can be put into said first optical network unit 3, i.e. said communication service switch device 8 is integrated with said first optical network unit 3.

The optical fiber access network can provide protection in wireless manner for the communication service between the optical branching divider and the optical network unit. When the optical fiber communication system is working, the second detection module 31 detects the amplitude, power and/or energy of the signal transmitting in the optical fiber communication system. When a failure of being cut off happens in the optical fiber between the optical branching divider 2 and the first optical network unit 3, the second detection module 31 detects that the amplitude, power and/or energy of the signal are lower than the preset threshold and considers that the signal is lost. The communication service switch device 8 switches the user terminal integration access device 4 to the wireless user terminal device 7 to make the communication service of the optical fiber communication system be switched to the wireless communication system. Because the optical fiber communication is better than the wireless communication system in the aspect of transmitting rate and stability and so on, it is considered that the failure of being cut in the optical fiber is eliminated when the second detection module 31 detects that the amplitude, power and/or energy of the signal from branching divider 2 are higher than the preset threshold. The communication service switch device 8 switches the user terminal integration access device 4 to the first optical network unit 3 make the communication service be switched back to the optical fiber communication system.

The present invention adopts the 1+1 protection manner to protect the optical fiber line between the optical line terminal and the optical branching divider in the optical fiber access network, and adopts the wireless communication system to protect the optical fiber line between the optical branching divider and the optical network unit in the star structure optical fiber access network at the same time, which not only meets the need of user to the unusable time of the network so as to ensure the fluency of the communication service of the user in the stat structure optical network and especially the group users, but also breaks through the restriction of the resource of the pipe and optical cable and reduces the cost of investment, operation and maintenance. It can also be used to quickly cover the communication area where there is no optical cable in wireless way. After the optical cable is paved, the wireless communication system can be used as the protection system of the optical fiber communication system so as to facilitate the implementation step by step and the utilization of the device. In addition, the present invention sets the wireless base station near the optical branching divider so as to reduce the requirement for the coverage scope of the wireless base station. At the same time, the problem of stadia transmission in a project can be easily solved. The present invention adopts the wireless communication system which can dynamically allocate the bandwidth to protect the fiber access network. After the failure of being cut off in the access optical fiber happens, the bandwidth of the wireless communication system can be concentrated to the optical network unit influenced to protect the bandwidth need of the user. When there isn't any failure, it can provide the wireless access service for many users so as to increase the utilization rate of the bandwidth in the communication system and enrich the service provided.

The present invention will be described in more detail with reference too the following figures and embodiments.

A more detailed description of the invention is provided in the following description and appended claims taken in conjunction with the accompanying drawings.

DETAILED DESCRIPTION OF THE INVENTION

The following is a detailed description and explanation of the preferred embodiments and best modes contemplated by the inventors of carrying the invention along with some examples thereof.

The main idea of the present invention is to bring in the wireless communication system to protect the optical fiber line between the optical branching divider 2 and the first optical network unit 3 in the star structure optical fiber access network. The optical fiber access network with protection comprises the optical fiber communication system, the wireless communication system, the second optical network unit 6, and the communication service switch device 8. The communication service switch device 8 switches the communication service from the optical fiber communication system to the wireless communication system when there is failure of being cut off in the optical fiber between the optical branching divider 2 and the first optical network unit 3 in the optical fiber communication system. Because the optical fiber communication is better than the wireless communication system at the aspect of transmitting rate and stability, etc, the communication service switch device 8 switches the communication service from the wireless communication system back to the optical fiber communication system after the failure of being cut off in the optical fiber is cleared.

Figure 1:
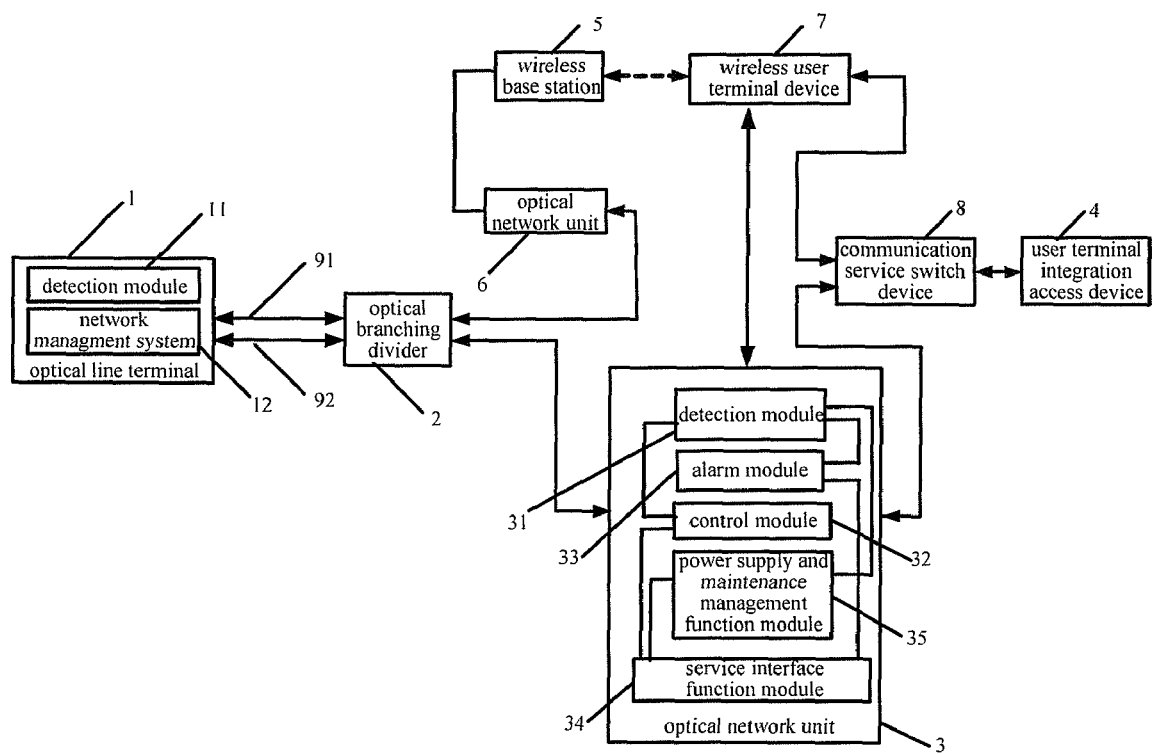
FIG. 1 shows the system structure view of the optical fiber access network in accordance with the present invention.

FIG. 1 is the system structure view of the optical fiber access network in accordance with the present invention. In the optical fiber access network, the optical fiber communication system at least comprises an optical line terminal 1, an optical branching divider 2, the first optical network unit 3 and an integration access device of user terminal 4. Wherein, the optical line terminal 1 has an interface to the switching equipment, router and the optical branching divider 2 to communicate with the optical branching divider through the work fiber 91 and the protection optical fiber 92 which protects the line of the work fiber 91, and provide necessary means to transmit various communication services. A first detection module 11 for detecting the signal in the work fiber 91 and protection optical fiber 92 and a network managing system 12 for managing integrated services of the optical line terminal 1 are set in the optical line terminal 1. The first detection module 11 is connected with the network managing system 12. The optical branching divider 2 provides the physical connection taking optical fiber as the transmission medium for the first optical network unit 3 and optical line terminal 1, makes the signal transmitted in optical fiber conduct power reallocation after being coupled in the coupling area. The first optical network unit 3 is connected with the communication service switch device 8 for switching the communication line by optical fibers. The first optical network unit 3 at least comprises a second detection module 31 for detecting signals, an alarm module 33 for producing an alarm message of signal loss when the second detection module 31 detects no signal, a control module 32 for sending a switch control signal to the communication service switch device 8, a service interface function module 34 for sending and receiving the message of the wireless user terminal device 7 and a power supply and maintenance management function module 35 for supplying power and managing integrated services to the first optical network unit 3. Wherein, the second detection module 31 is connected with the alarm module and the power supply and maintenance management function module, and can also be connected with the control module 32. Specifically, amplitude, power and/or energy detection devices and so on can be adopted. The alarm module 33 is connected with the service interface function module 34 and can be integrated with the detection module 31. The service interface function module 34 is also connected with the power supply and maintenance management function module 35 and the communication service switch device 8, and is connected with the optical branching divider 2 and the wireless user terminal device 7. The control module 32 is communicated with the service interface function module 34 and the power supply and maintenance management function module 35.

The wireless communication system comprises a wireless base station 5 and the wireless user terminal device 7, wherein the wireless base station 5 is set near the optical branching divider 2, communicates with the optical branching divider 2 through the second optical network unit 6, and wirelessly communicates with the wireless user terminal device 7 so as to accomplishing the wireless sending and receiving and the management of the wireless resource etc, which can be a point to point system or one point to several points system, for example, a WiMax system. The wireless user terminal device 7 is provided with a first optical network unit 3 and the interface of the user terminal integration access device 4. The wireless user terminal device 7 is connected with the communication service switch device 8 for switching the communication line, and is connected with said first optical network unit 3 for receiving the alarm message coming from the first optical network unit 3 and the communication service switched so as to realize the message transmission between the wireless base station 5 and the user terminal integration access device 4.

Communication service switch device 8 is used to switch the communication line, wherein the wireless user terminal device 7 and the first optical network unit 3 are connected with the communication service switch device 8 respectively. The communication service switch device 8 is connected with the user terminal integration access device 4. The switch of the communication service switch device 8 is controlled by the control module 32 in the first optical network unit 3, which can be set independent to the first optical network unit 3 or in the first optical network unit 3, i.e. integrated with the communication service switch device 8. Specifically, an electric switch, an optical switch, a photoelectric switch, a micromechanical switch or an optical waveguide switch and so on can be adopted.

Figure 2:
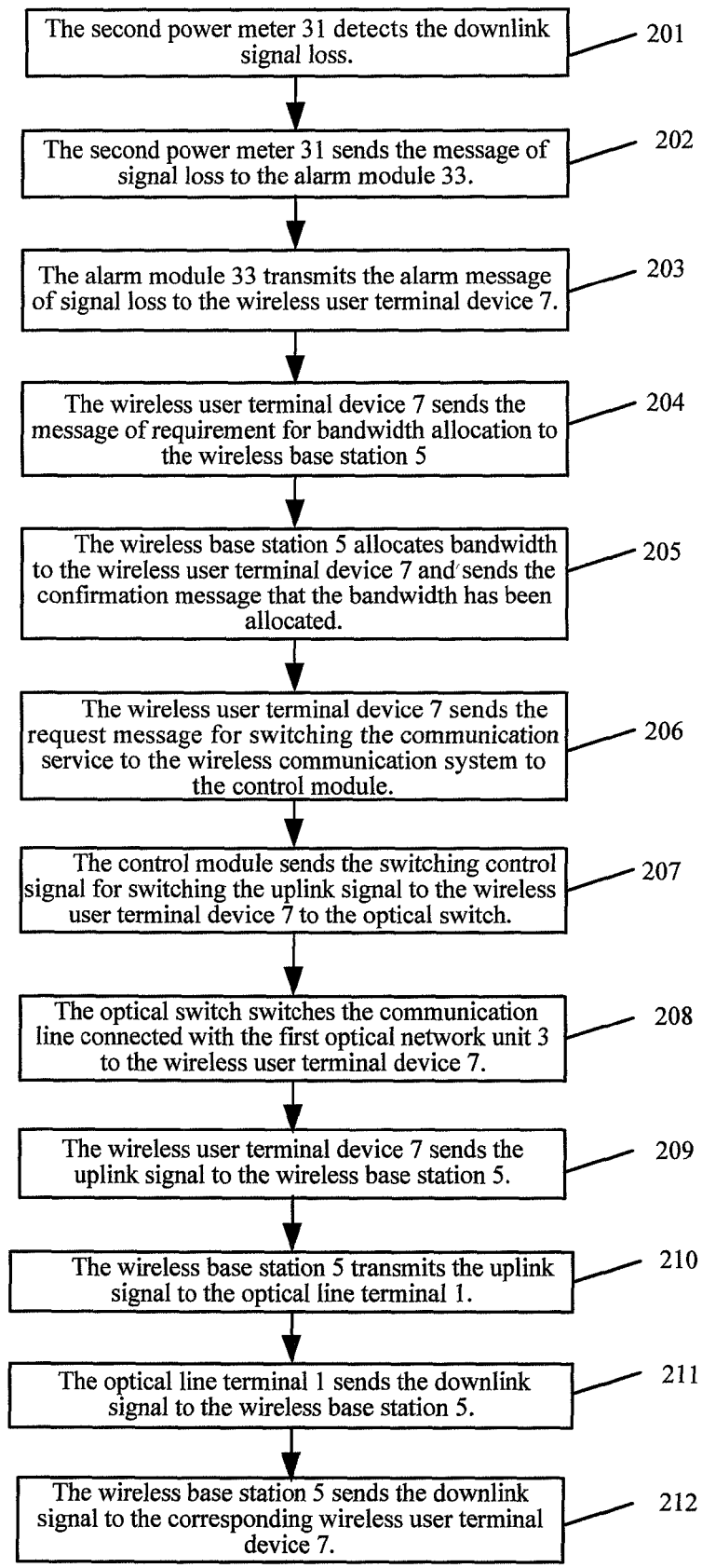
FIG. 2 shows the processing flow chart for switching the communication service from the optical fiber communication system to the wireless communication system.

When the optical fiber communication system is working, the second detection module 31 detects the signal transmitted in the work line. When there is failure of being cut off in the optical fiber between the optical wiring network 2 and the first optical network unit 3, the communication service switch device 8 switches the communication service transmitted between the optical wiring network 2 and the first optical network unit 3 to the wireless communication system, i.e. switches the communication service from the optical fiber communication system to the wireless communication system. As shown in FIG. 2, it is the specific processing flow of switching the communication service from the optical fiber communication system to the wireless communication system, and following steps are executed:

201. when the second power meter 31 detects that the signal power is less than the preset threshold power, it is considered that the downlink signal is lost;

202. the second power meter 31 sends the message of signal loss to the alarm module 33;

203. the alarm module 33 transmits the alarm message of signal loss to the wireless user terminal device 7;

204. the wireless user terminal device 7 sends the message for requiring bandwidth allocation to the wireless base station 5;

205. the wireless base station 5 allocates the corresponding bandwidth to the wireless user terminal device 7, and sends the confirmation message that the bandwidth has been allocated;

206. the wireless user terminal device 7 sends the request message for switching the communication service to the wireless communication system to the control module 32;

207. the control module 32 sends a switching control signal to the switch;

208. the switch switches the communication line connected with the first optical network unit 3 to the wireless user terminal device 7 in accordance with the switching control signal so as to make the uplink signal of the communication service be switched to the wireless user terminal device 7;

209. the wireless user terminal device 7 transmits the uplink signal to the wireless base station 5;

210. the wireless base station 5 transmits the uplink signal to the optical line terminal 1;

211. the optical line terminal 1 sends the downlink signal to the wireless base station 5 through the optical network unit 6;

212. the wireless base station 5 sends the downlink signal to the corresponding wireless user terminal device 7 so as to complete the switching of the communication service line.

Wherein, the message of signal loss can also be directly sent to the control module 32 after the second power meter 31 detects that the downlink signal power is less than the preset threshold power. The control module 32 controls the switch to switch the communication service to the wireless communication system, i.e. the steps 202~206 can be omitted.

Figure 3:
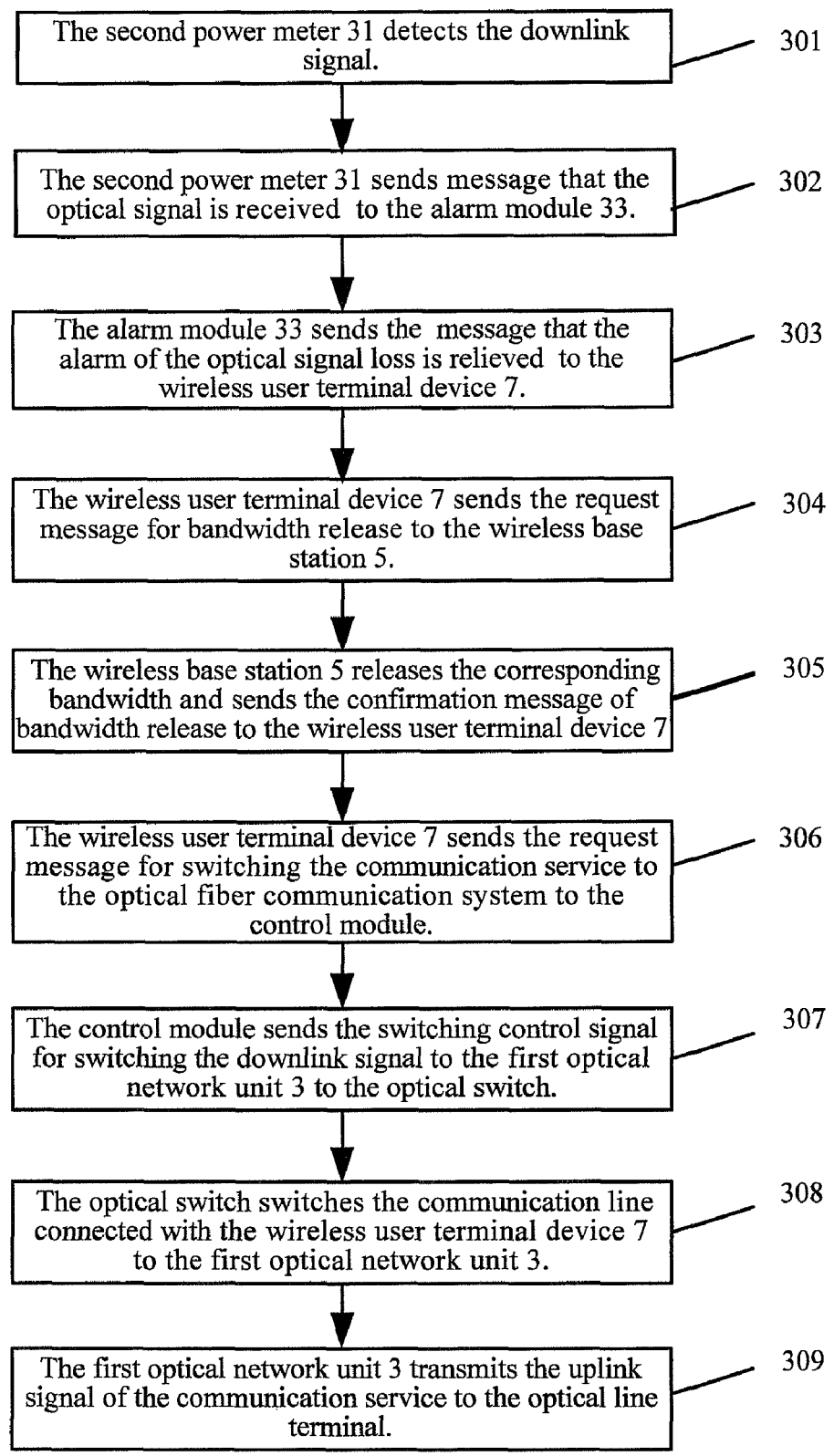
FIG. 3 shows the processing flow chart for switching the communication service from the wireless communication system back to the optical fiber communication system.

Because it is a broadcast mode at the downlink direction, the second power meter 31 in the first optical network unit 3 can detect the signal coming from the optical line terminal 1 after the failure of being cut off in the optical fiber between the optical wiring network 2 and the first optical network unit 3 is repaired. The communication service switch device 8 switches the communication service transmitted by the wireless communication system back to the optical fiber communication system, i.e. it switches the communication service from the wireless communication system back to the optical fiber communication system. As shown in FIG. 3, it is the specific processing flow of switching the communication service from the wireless communication system back to the optical fiber communication system, and the following steps are executed:

301. when the second power meter 31 detects that the signal power is larger than the preset threshold power, the downlink signal is considered to be received;

302. the second power meter 31 sends message that the signal is received to the alarm module 33;

303. the alarm module 33 sends a message that the alarm of signal loss is relieved to the wireless user terminal device 7;

304. the wireless user terminal device 7 sends a request message for bandwidth release to the wireless base station 5;

305. the wireless base station 5 releases the corresponding bandwidth, and sends the confirmation message for bandwidth release to the wireless user terminal device 7;

306. the wireless user terminal device 7 sends a request message for switching the communication service to the optical fiber communication system to the control module 32;

307. the control module 32 sends a switching control signal to the switch;

308. the switch switches the communication line connected with the wireless user terminal device 7 to the first optical network unit 3 in accordance with the switching control signal so as to make the uplink signal of the communication service be switched to the first optical network unit 3;

309. the first optical network unit 3 transmits the uplink signal of the communication service to the optical line terminal so as to accomplish the switching of the communication service line.

In the same way, the message that the signal is received can be directly sent to the control module 32 after the second power rating meter 31 detects that the signal power is larger than the preset threshold power. The control module 32 controls the switch to switch the communication service to the optical fiber communication system, i.e. the steps 302~306 can be omitted.

It should be understood that the above embodiments are only used to explain, but not to limit the technical solution of the present invention. In addition to the detailed description of the present invention referring to above preferred embodiments, it should be understood that various modifications, changes or equivalent replacements can be made by those skilled in the art without departing from the spirit and scope of the present invention and covered in the claims of the present invention.

Furthermore, although embodiments and examples of the invention have been shown and described, it is to be understood that various modifications, substitutions, and rearrangements of components, parts, structural features, and method steps, as well as other uses of the invention, and other processes, can be made by those skilled in the art without departing from the novel spirit and scope of the invention.

What is claimed is:

1. An optical fiber access network comprising an optical fiber communication system which is provided with an optical line terminal (1), an optical branching divider (2), a first optical network unit (3) and a user terminal integration access device (4), and a protection optical fiber (92) set between the optical line terminal (1) and the optical branching divider (2) for protecting the line of a work optical fiber (91), characterized in that said optical fiber access network further comprises a wireless base station (5) connected with said optical branching divider (2) through a second optical network unit (6); said wireless base station (5) wirelessly communicates with a wireless user terminal device (7); said wireless user terminal device (7) and said first optical network unit (3) are connected with a communication service switch device (8) for switching the communication line respectively; said communication service switch device (8) is connected with said user terminal integration access device (4); said wireless user terminal device (7) further communicates with said first optical network unit (3); said first optical network unit (3) is provided with a second detection module (31) for detecting signals and a control module (32) for sending a switching control signal to said communication service switch device (8).

2. The optical fiber access network as claimed in claim 1, characterized in that said communication service switch device (8) is integrated with said first optical network unit (3).

3. The optical fiber access network as claimed in claim 1, characterized in that said second detection module (31) is connected with said control module (32).

4. The optical fiber access network as claimed in claim 1, characterized in that said first optical network unit (3) is further provided with an alarm module (33) for producing an alarm message of signal loss when said second detection module (31) detects no signal, said alarm module (33) is connected with the service interface function module (34) in said first optical network unit (3).

5. The optical fiber access network as claimed in claim 4, characterized in that said alarm module (33) is integrated with said detection module (31).

6. The optical fiber access network as claimed in claim 5, characterized in that said detection module is an amplitude, power and/or energy detection device.

7. The optical fiber access network as claimed in claim 1, characterized in that said optical line terminal (1) is provided with a first detection module (11) for detecting the signal in the work optical fiber (91) and the protection optical fiber (92), and a network management system (12) for managing the integrated services of said optical line terminal (1); said first detection module (11) is connected with said network management system (12).

8. A communication protection method of the optical fiber access network as claimed in claim 1, characterized in that the communication service switch device switches the communication service from the optical fiber communication system to the wireless communication system, which comprises the following steps:

step 1. the second detection module (31) sending a message of signal loss to the control module (32) when it detects that the amplitude, power and/or energy of the signal is less than the preset threshold power;

step 2. said control module (32) sending a switching control signal to the communication service switch device (8);

step 3. said communication service switch device (8) switching the communication line connected with the first optical network unit (3) to said wireless user terminal device (7) in accordance with said switching control signal so as to make the uplink signal of the communication service be switched to said wireless user terminal device (7);

step 4. said wireless user terminal device (7) transmitting the uplink signal to the wireless base station (5);

step 5. said wireless base station (5) transmitting the uplink signal to the optical line terminal (1);

step 6. said optical line terminal (1) sending the downlink signal to said wireless base station (5) through the optical network unit (6);

step 7. said wireless base station (5) sending the downlink signal to said wireless user terminal device (7) so as to complete the switching of the communication service line.

9. The communication protection method of the optical fiber access network as claimed in claim 8, characterized in that following steps are further comprised between said step 1 and step 2:

step 11. said second detection module (31) sending the message of signal loss to the alarm module (33);

step 12. said alarm module (33) transmitting the alarm message of signal loss to said wireless user terminal device (7);

step 13. said wireless user terminal device (7) sending the message of requirement for bandwidth allocation to the wireless base station (5);

step 14. said wireless base station (5) allocating the corresponding bandwidth to said wireless user terminal device (7) and sending the confirmation message that the bandwidth has been allocated;

step 15. said wireless user terminal device (7) sending the request message for switching the communication service to the wireless communication system to said control module (32).

10. The communication protection method of the optical fiber access network as claimed in claim 8, characterized in that said communication service switch device switches the communication service from said wireless communication system back to said optical fiber communication system after said step 7, which comprises following steps:
- step 71. said second detection module (31) sending the message that the signal is received to said control module (32) when it detects that the amplitude, power and/or energy of the signal is larger than the preset threshold power;
- step 72. said control module (32) sending a switching control signal to said communication service switch device (8);
- step 73. said communication service switch device (8) switching the communication line connected with the wireless user terminal device (7) to the first optical network unit (3) in accordance with said switching control signal so as to make the uplink signal of the communication service be switched to said first optical network unit (3);
- step 74. said first optical network unit (3) transmitting the uplink signal of the communication service to said optical line terminal (1) so as to completing the switching of the communication service line.

11. The communication protection method of the optical fiber access network as claimed in claim 10, characterized in that following steps are further comprised between said step 71 and step 72:
- step 711. the second detection module (31) sending the message that the downlink signal is received to the alarm module (33);
- step 712. said alarm module (33) sending a message that the alarm of signal loss is relieved to the wireless user terminal device (7);
- step 713. said wireless user terminal device (7) sending the request message for bandwidth release to said wireless base station (5);
- step 714. said wireless base station (5) releasing the corresponding bandwidth and sending the confirmation message for bandwidth release to said wireless user terminal device (7);
- step 715. said wireless user terminal device (7) sending the request message for switching the communication service to the optical fiber communication system to said control module (32).

12. The optical fiber access network as claimed in claim 2, characterized in that said first optical network unit (3) is further provided with an alarm module (33) for producing an alarm message of signal loss when said second detection module (31) detects no signal, said alarm module (33) is connected with the service interface function module (34) in said first optical network unit (3).

13. The optical fiber access network as claimed in claim 3, characterized in that said first optical network unit (3) is further provided with an alarm module (33) for producing an alarm message of signal loss when said second detection module (31) detects no signal, said alarm module (33) is connected with the service interface function module (34) in said first optical network unit (3).

* * * * *